United States Patent [19]
Lee

[11] Patent Number: 5,825,575
[45] Date of Patent: Oct. 20, 1998

[54] CONTROLLING VOICE COIL MOTOR OF HARD DISK DRIVE FOR DECENTRALIZING ABRASION OF PARKING ZONE OF DISK

[75] Inventor: Bong-Jin Lee, Seoul, Rep. of Korea

[73] Assignee: SamSung Electronics Co., Ltd., Suwon, Rep. of Korea

[21] Appl. No.: 705,941

[22] Filed: Aug. 29, 1996

[30] Foreign Application Priority Data

Aug. 31, 1995 [KR] Rep. of Korea .................. 28391/1995

[51] Int. Cl.⁶ .................................................. G11B 21/02
[52] U.S. Cl. .................................................. 360/75
[58] Field of Search .................. 360/75, 78.08, 360/75 A, 75 G

[56] References Cited

U.S. PATENT DOCUMENTS

| | | | |
|---|---|---|---|
| 4,679,102 | 7/1987 | Wevers et al. | 360/75 |
| 4,786,994 | 11/1988 | Carteau et al. | 360/75 |
| 4,833,550 | 5/1989 | Takizawa et al. | 360/75 |
| 4,907,106 | 3/1990 | Yamada | 360/75 |
| 4,987,502 | 1/1991 | Freeze | 360/75 |
| 5,050,015 | 9/1991 | Hack et al. | 360/75 |
| 5,198,942 | 3/1993 | Iizuka et al. | 360/78.04 |
| 5,303,100 | 4/1994 | Nakayama et al. | 360/104 |
| 5,371,637 | 12/1994 | Yamada | 360/75 |
| 5,384,675 | 1/1995 | Crawforth et al. | 360/75 |
| 5,446,606 | 8/1995 | Brunner et al. | 360/75 |

FOREIGN PATENT DOCUMENTS

| | | | |
|---|---|---|---|
| 0255240 | 2/1988 | European Pat. Off. | 360/75 |
| 0217965 | 9/1986 | Japan | 360/75 |
| 0156466 | 6/1990 | Japan | 360/75 |

*Primary Examiner*—Nabil Hindi
*Attorney, Agent, or Firm*—Robert E. Bushnell, Esq.

[57] ABSTRACT

A voice coil motor control technique which can improve the reliability of a hard disk drive by decentralizing the abrasion of a parking zone of a disk used as a magnetic recording medium includes: when power is first supplied to the hard disk drive having a head positioned in a first region within the parking zone, driving a spindle motor in order to rotate the disk and supplying a fixed current to a voice coil motor in order to move the head positioned in the first region therewithin; applying to the voice coil motor, a fixed current in a reverse direction so as to move the head to a second region within the parking zone; and supplying a unlatching current to the voice coil motor in order to move the head to a data zone when a uniform velocity rotation of the spindle motor is sensed.

14 Claims, 4 Drawing Sheets

CONTROLLING VOICE COIL MOTOR OF HARD DISK DRIVE FOR DECENTRALIZING ABRASION OF PARKING ZONE OF DISK

CROSS REFERENCE TO RELATED APPLICATIONS

This application makes reference to, incorporates the same herein, and claims all benefits accruing under 35 U.S.C §119 from an application entitled VOICE COIL MOTOR CONTROL METHOD OF HARD DISK DRIVE FOR DECENTRALIZING ABRASION OF PARKING ZONE OF DISK earlier filed in the Korean Industrial Property Office on 31 Aug. 1995, and there duly assigned Ser. No. 28391/1995 by that Office.

BACKGROUND OF THE INVENTION

1. Field of the Invention

The present invention relates to a hard disk drive, and more particularly to a voice coil motor (hereinafter, referred to as a VCM) control technique for controlling a current supplied to a VCM in order to decentralize the abrasion of a parking zone of a disk.

2. Description of the Related Art

A head disk drive for magnetic writing and reading data on a rotatory magnetic disk, can access a large amount of data at a high speed, and thus, is widely used as an auxiliary memory of a computer system.

In a disk of a hard disk drive, there is a data zone and a parking zone. The data zone includes a servo information area for writing servo information for the position and velocity control of a head and a data area for writing actual data, a maintenance area for writing information about defects of the disk, and the like. The parking zone is a region in which the head is positioned when the hard disk drive is not executing a normal operation, that is, when a driving power supply of the hard disk is off Usually, the parking zone is positioned at the inner side of the disk. In order to prevent the head and the disk from being damaged, when the driving, power supply is cut off, the head positioned in the data zone is moved to a contact start-stop zone within the parking zone and thereafter the rotation of the spindle motor is stopped. Accordingly, the head is in contact within the disk only in the contact start-stop zone. In such a case, when the spindle motor is start or stopped, the disk is abraded by the friction between the head and the disk. For this reason, if the contact start-stop operation is frequently implemented, the head consistently abraded the same region, eventually damaging the disk.

In the recent Brunner, et al. patent, U.S. Pat. No. 5,446,606 entitled DISC DRIVE WITH SEPARATE LANDING AND TAKEOFF ZONE, a disk drive has separate landing and takeoff zones to distribute wear to two zones to prolong the life of the hard disk drive.

The earlier patent to Freeze, U.S. Pat. No. 4,987,502 entitled ANTI-WEAR DISK DRIVE SYSTEM, randomly selects successive disk tracks to evenly distribute wear across a hard disk.

The two patents to Amata, U.S. Pat. Nos. 4,907,106 entitled HEAD SLIDER DRIVING MECHANISM FOR A MAGNETIC DISK APPARATUS and 5,371,637 entitled DISK APPARATUS, each disclose disk apparatus in which the magnetic head is moved rapidly during a parking operation to reduce the abrasion of the disk.

Additionally, the earlier patent to Takizawa, et al., U.S. Pat. No. 4,833,550 entitled MAGNETIC DISK DEVICE HAVING A MECHANISM FOR REMOVING AN ADHESION BETWEEN A MAGNETIC HEAD AND A MAGNETIC DISK, teaches the reversing of the current in a voice coil motor of a magnetic disk drive to remove an adhesion between a magnetic head and a magnetic disk.

It is noted, however, that none of the cited references teach or suggest decentralizing the abrasion of a parking zone of a disk by applying a reverse current to the voice coil motor of a hard disk drive as in the present invention.

SUMMARY OF THE INVENTION

It is an object of the present invention to provide a voice coil motor control technique, capable of improving the reliability of a hard disk drive by decentralizing the abrasion of a parking zone of a disk used as a magnetic recording medium.

According to one aspect of the present invention, a voice coil motor control technique of a hard disk drive for decentralizing the abrasion of a parking zone of a disk includes: when power is supplied to the hard disk drive having a head positioned in a first region within the parking zone, driving a spindle motor in order to rotate the disk and supplying a fixed current to a voice coil motor in order to move the head positioned in the first region therewithin; supplying a fixed current in the reverse direction to the voice coil motor so as to move the head to a second region within the parking zone, and supplying a unlatching current to the voice coil motor in order to move the head to a data zone when the uniform velocity rotation of a spindle motor is sensed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF TIM PREFERRED EMBODIMENT

Figure 1:
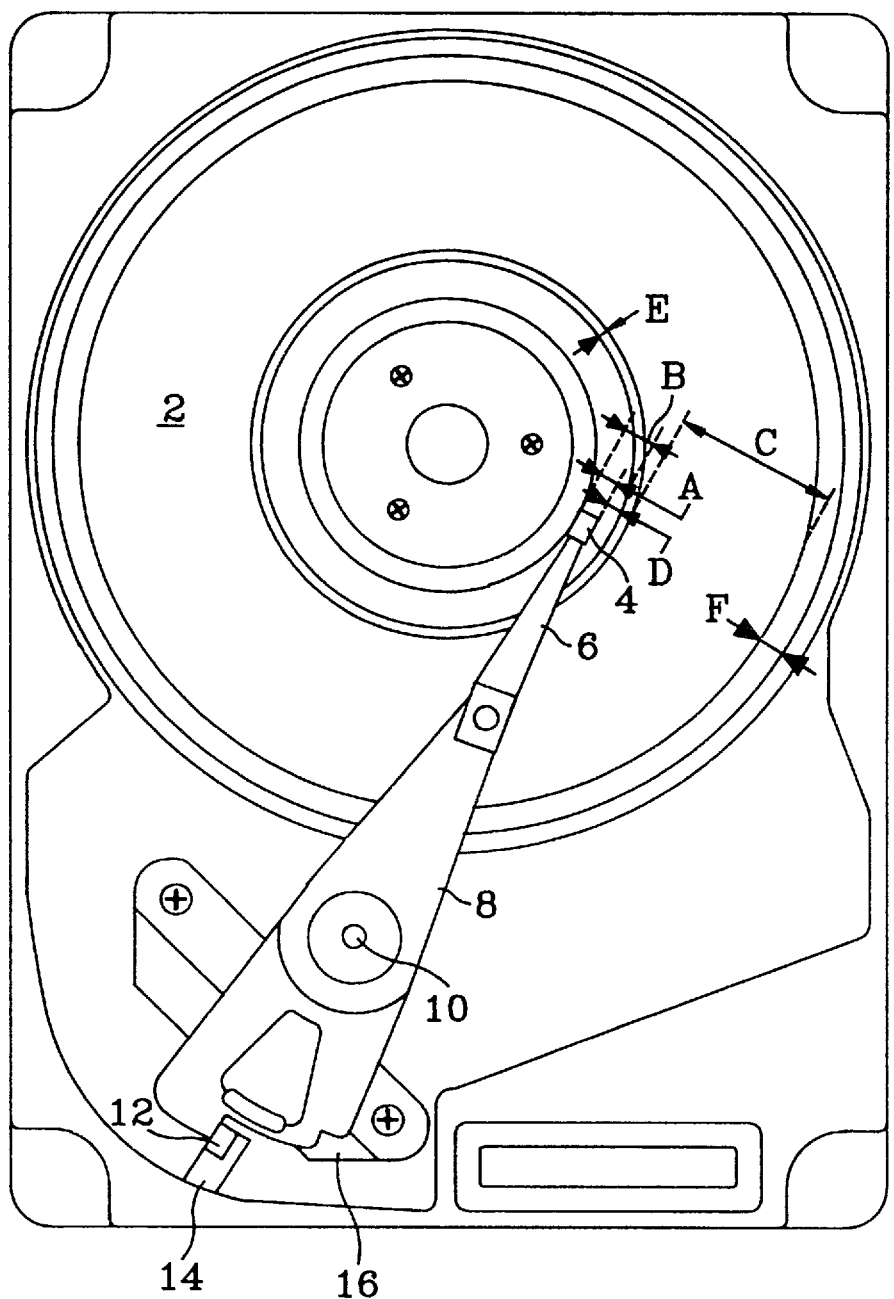
FIG. 1 is a top view showing a hard disk drive.

Throughout the drawings, it is noted that the same reference numerals of letter will be used to designate like or equivalent elements having the same function. Further, in the following description, numeral specific details are set forth to provide a more through understanding of the present invention. It will be apparent, however, to one skilled in the art that the present invention may be practiced without these specific details. A detailed description of known functions and constructions unnecessarily obscuring the subject matter of the present invention has been omitted in this application for the sake of clarity.

A head disk drive for magnetically writing and reading data on a rotary magnetic disk, can access a large amount of data at a high speed, and thus, is widely used as an auxiliary memory of a computer system. In a disk of a hard disk drive, there are a data zone C and a parking zone B, as shown in FIG. 1. The data zone C includes a servo information area for writing servo information for the position and velocity control of a head 4, a data area for writing actual data, a maintenance area for writing information about defects, etc. of the disk, and the like. The parking zone B is a region in which the head 4 is positioned when the hard disk drive is not executing a normal operation, that is, when a driving power supply of the hard disk drive is off. Usually, the parking zone B is positioned at the inner side of the disk 2. In order to prevent the head 4 and the disk 2 from being damaged, when the driving power supply is cut off, the head 4 positioned in the data zone C is moved to a contact start-stop (hereinafter, referred to as a CSS) zone A within the parking zone B and thereafter the rotation of a spindle-motor is stopped. Therefore, the head 4 is in contact with the disk 2 only in the CSS zone A. In such a case, when the spindle motor is started or stopped, the disk 2 is abraded by the friction between the head 4 and the disk 2. For this reason, if the contact startstop (CSS) is frequently implemented, e.g. if the driving power supply of the hard disk drive is frequently turned on or off, since an abraded region (the CSS zone) of the disk 2 becomes uniform, a lubricating region of the disk 2 may be rapidly damaged. A stiction condition, in which the spindle motor can not rotate, then often occurs between the head 4 and the disk 2. Additionally, if the abrasion of the disk 2 becomes more severe, there is a high probability that particles can be released due to the rotation of the disk 2, thereby deteriorating the performance of the head 4 during a data read or write operation.

Figure 2:
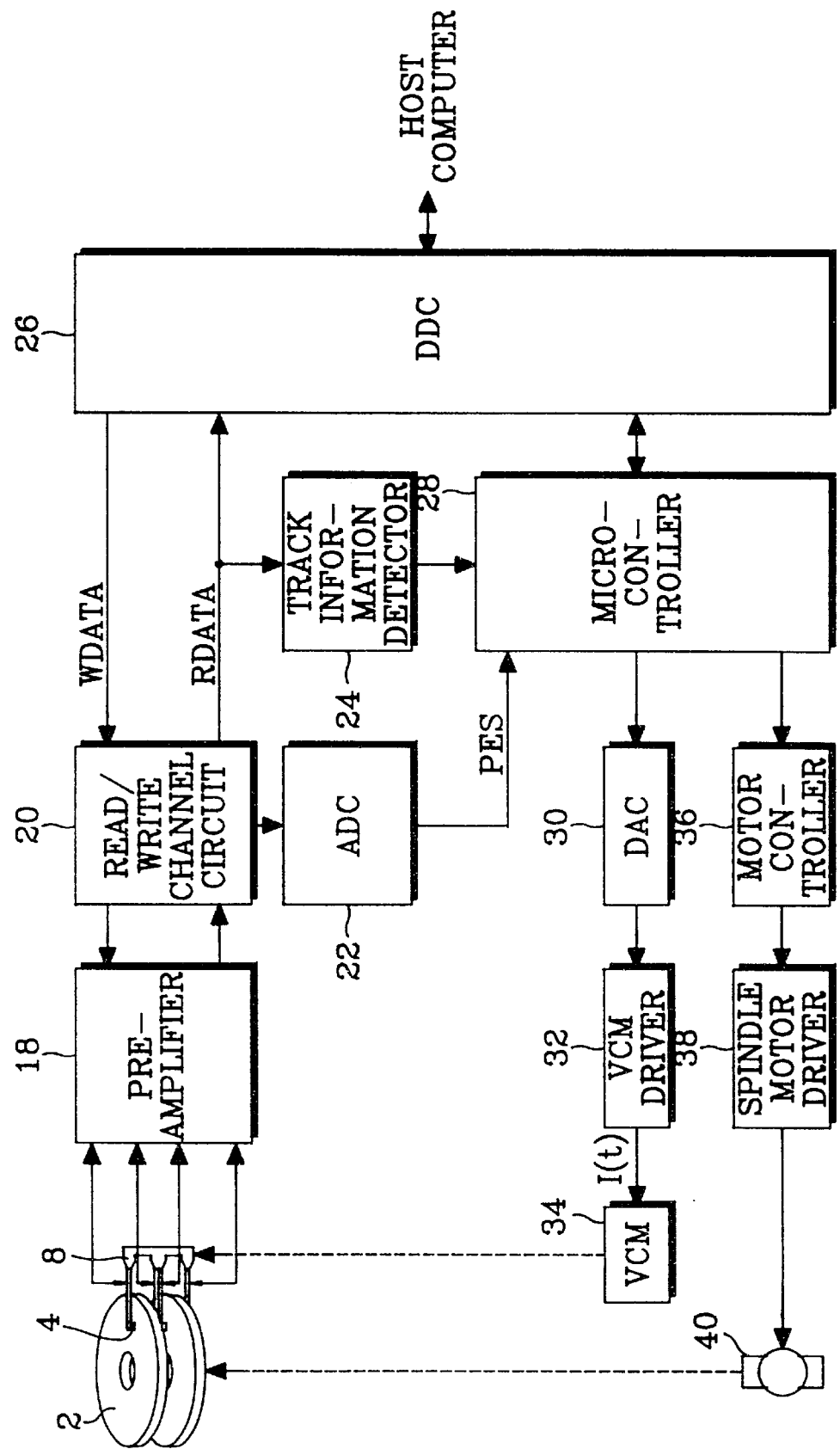
FIG. 2 is a block diagram showing the construction of a hard disk drive.
Figure 3:
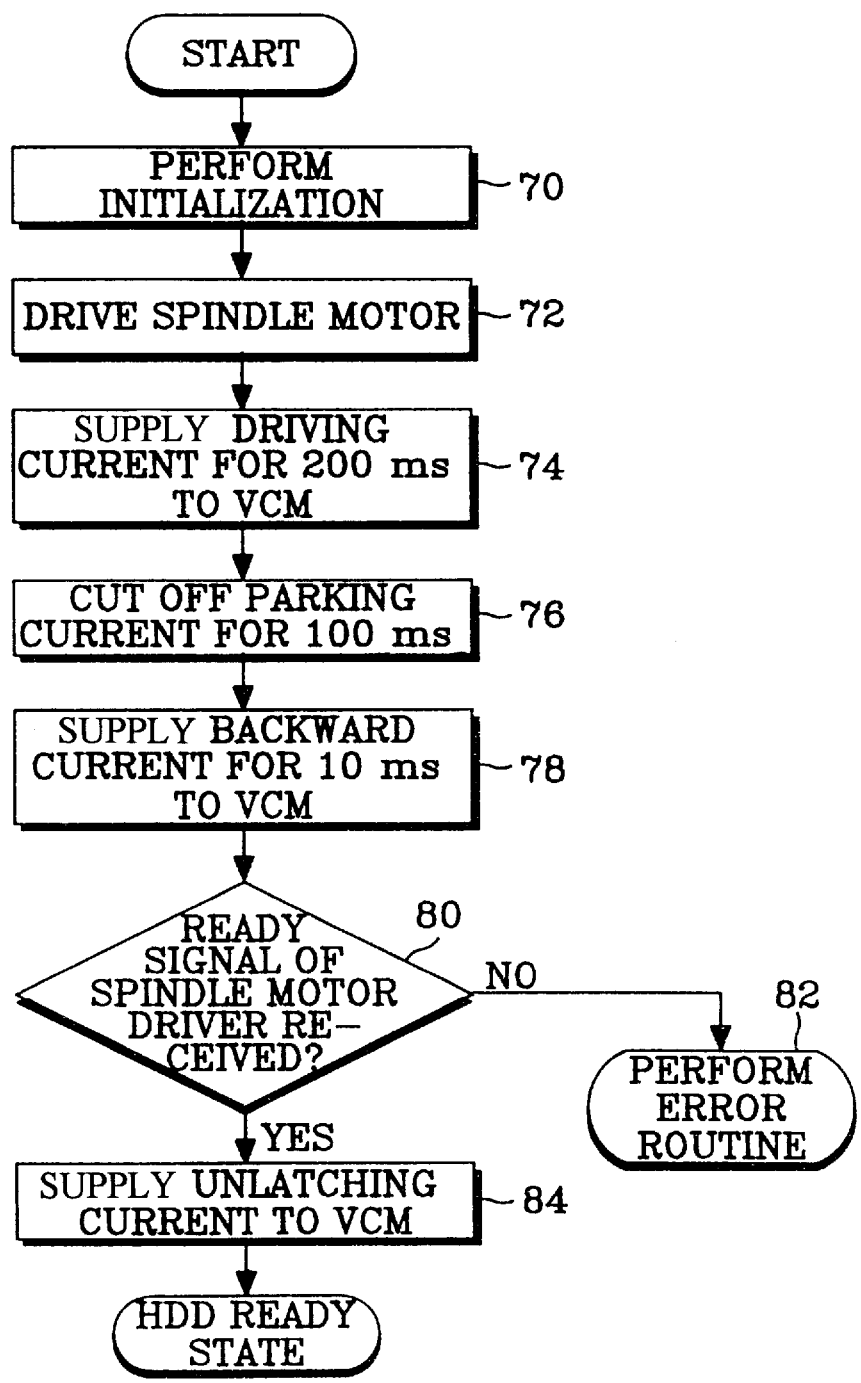
FIG. 3 is a flowchart showing the control steps of a microcontroller for controlling the amount of current supplied to a voice coil motor according to an embodiment of the present invention.

Referring to FIG. 2, disks 2 rotate by a spindle motor 40. Heads 4 are respectively positioned on surfaces of corresponding disks and installed so as to respectively correspond to supporting arms extended toward the disks 2 from an E-block assembly 8 which is coupled with a rotary voice coil motor (VCM) 34. When data is read, a pre-amplifier 18 pre-amplifies a signal picked up by one of the heads 4 and supplies an analog read signal to a read/write channel circuit 20. Alternatively when the data is written, the pre-amplifier 12 drives one of the heads 4 so as to write encoded write data supplied from the read/write channel circuit 20 on the disk 2. In such a case, the pre-amplifier 18 selects one of the heads 4 by the control of a disk data controller (hereinafter, referred to as a DDC) 26 controlled by a microcontroller 28. The read/write channel circuit 20 generates read data RDATA by detecting and decoding a data pulse from the read signal supplied from the pre-amplifier 18, and decodes write data WDATA supplied from the DDC 26, thereby supplying the decoded data to the pre-amplifier 18. Moreover, the read/write channel circuit 20 generates a position error signal PES by demodulating head position information which is contained in servo information written on the disk. The position error signal PES generated by the read/write channel circuit 20 is supplied to an analog-to-digital converter (hereinafter, referred to as ADC) 22, and the read data RDATA is supplied to a track information detector 24 and the DDC 26. The ADC 22 converts the position error signal PES to a digital step value corresponding thereto, and supplies the converted digital step valtie to the microcontroller 28. The track information detector 24 detects a track number, etc. indicating the current position of the head from tile read data RDATA, and supplies the detected track number, etc. to the microcontroller 28. The DDC 26 is controlled by the microcontroller 28 and writes data received from a host computer on the disk 2 via the read/write channel circuit 20 and the pre-amplifier 18, or reads data from the disk 2 to be transmitted to the host computer. The DDC 26 also interfaces communication between the host computer and the microcontroller 28. The microcontroller 28 controls the DDC 26 in response to a read or write command received from the host computer, and controls track seek and track following. The microcontroller 28 uses the track number supplied from the track information detector 24 and the position error signal PES received from the ADC 22 to control the track seek and the track following. A digital-to-analog converter (hereinafter, referred to as a DAC 30 converts a position control value of the heads 4 generated by the microcontroller 28 into an analog signal. A VCM driver 32 supplies a driving current I (t) to the VCM 34 for driving an actuator by the signal supplied from the DAC 30. The VCM 34 shifts the heads 4 on the disks 2 in response to the direction and level of the driving current I(t) inputted from the VCM driver 32. A motor controller 36 controls a spindle motor driver 38 according to a rotating control value of the disks 2 which is generated by the microcontroller 28. The spindle motor driver 38 rotates the disks 2 by driving the spindle motor 40 under the control of the motor controller 36.

Figure 4:
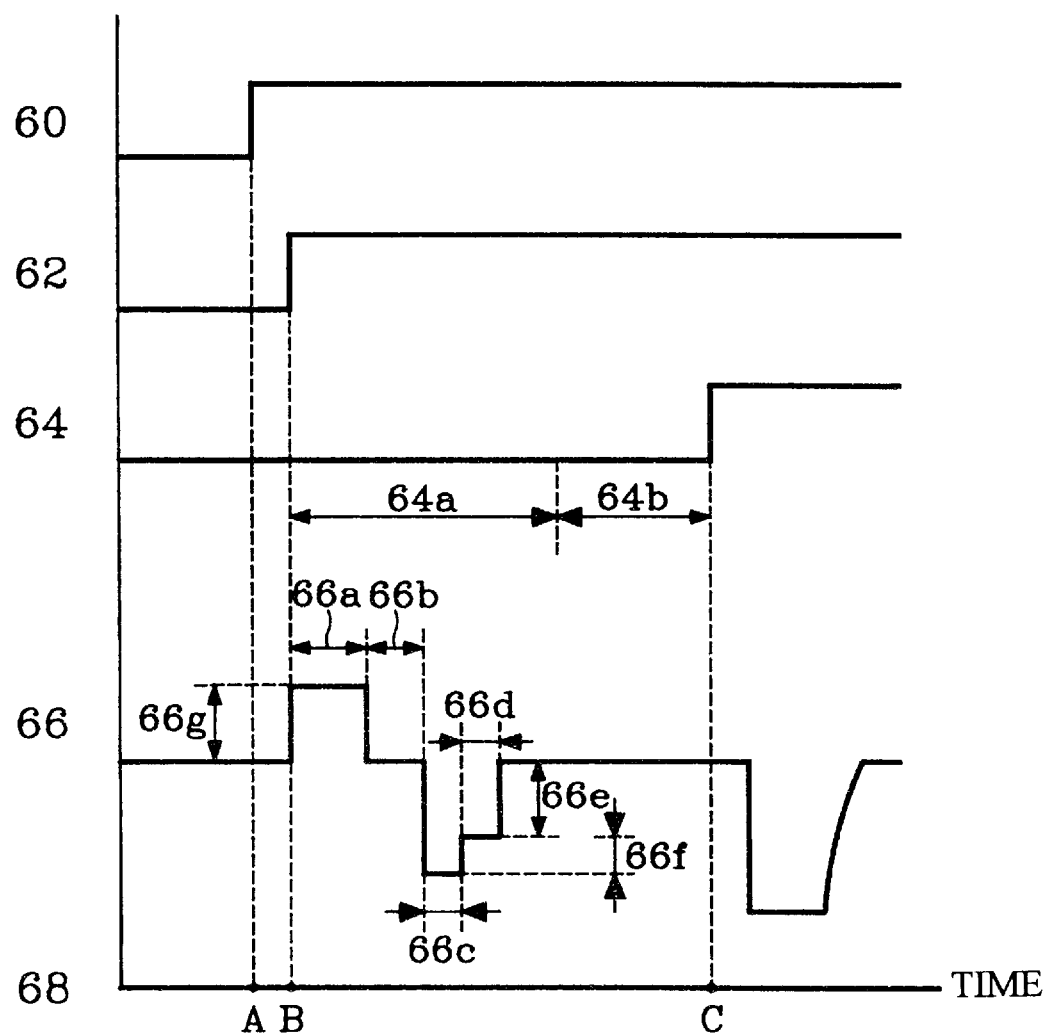
FIG. 4 is a timing chart showing a driving time of a spindle motor and the amount of current supplied to a VCM when power is supplied to a hard disk drive according to the present invention.

Referring to FIG. 4, reference numerals 60, 62, 64 and 66 are waveforms for comparing a driving power supplying time of each hard disk drive, a driving time of the spindle motor 40, a uniform velocity rotation (for example, 4500 RPM) arrival time of the spindle motor 40, and a variation time of the amount of current applied to the VCM 34, respectively. Reference numeral 68 indicates a time axis, wherein symbols A, B and C show the driving power supply supplying time of the hard disk drive, the driving time of the spindle motor 40 and the uniform velocity rotation arrival time of the spindle motor 40, respectively. Likewise, a time difference between A and B is 500 milliseconds, and that between A and C is 4 seconds. In the waveform 64 indicating the uniform velocity rotation arrival time of the spindle motor 40, 64a indicates a time interval of about 1 second in which the head 4 is in contact with the disk 2, and 64b designates a time interval for which the head 4 is separated from the disk 2. The waveform 66 showing the variation time of the amount of current supplied to the VCM 34, time intervals 66a, 66b, 66c and 66d are 200 milliseconds, 100 milliseconds, 2 milliseconds and 8 milliseconds, respectively, and 66e, 66f and 66g designating the amount of current supplied to the VCM 34 by the control of the microcontroller 28 are −40 mA, −8 mA and 4 mA, respectively.

If the driving power supply of the hard disk drive is turned on, the microcontroller 28 performs, in step 70, initialization for setting an initial parameter and controlling the hard disk drive system according to an initialization program, and then proceeds to step 72. The time to turn on the driving power supply of the hard disk drive is a reference time A of 0 seconds. In step 72, the microcontroller 28 drives the spindle motor 40 by supplying an enable signal to the spindle motor driver 38 through the motor controller 36, and then proceeds to step 74. The driving time B of the spindle motor 40 is after 500 milliseconds from the reference time A when the driving power supply is first supplied. In step 74, the microcontroller 28 supplies a current of 4 mA (hereinafter, referred to as a parking current) for the time interval 66a of about 200 milliseconds to the VCM 34 by controlling the VCM driver 32, and then proceeds to step 76. The current of 4 mA supplied to the VCM 34 is designated as the current for fixing the actuator at a magnet latch and, for the convenience of illustration, is referred to as a fixed current in the following description. The object of supplying the fixed current to the VCM 34 is that the head 4 is prevented from being moved to the data zone C so as to avoid the abrasion between the head 4 and the disk 2 upon initially driving the spindle motor 40. After supplying the fixed current to the VCM 34, the microcontroller 28 controls the VCM driver 32 and cuts off the fixed current supplied to the VCM 34 for about 100 milliseconds (66*b*) in step 76, and then proceeds to step 78. Following that, in step 78, the microcontroller 28 controls the VCM driver 32, and thus moves the head 4 from the CSS zone A to an inner guide band E by supplying the backward current of −48 mA(66*e*+66*f*) for 2 milliseconds (66*c*). Therefore, the head 4 and the disk 2 are in contact with each other in regions except for the CSS zone A (hereinafter, defined as a second region). The microcontroller 28 again moves the head 4 to an arbitrary region of the parking zone B (hereinafter, defined as a third region) by reducing to −40 mA (66*e*), the backward current (66*e*+66*f*) applied to the VCM 34 and supplying the reduced current to the VCM 34 for about 8 milliseconds (66*d*), and then proceeds to step 80. For the time interval 64*b* in which the spindle motor 40 reaches to the uniform velocity rotation of 4500 RPM, while the head 4 is separated from the disk 2 to a constant height, the spindle motor driver 38 senses whether or not the spindle motor 40 has reached to the uniform velocity rotation. If the uniform velocity rotation arrival time C of the spindle motor 40 is sensed, i.e., if it is sensed that the spindle motor 40 has reached the uniform velocity rotation, the spindle motor driver 38 outputs a ready signal "Ready" in correspondence with the sensed state. In step 80, the microcontroller 28 checks whether or not the ready signal "Ready" has been inputted. If the ready signal "Ready" has not been received, the microcontroller 28 executes an error routine in step 82. Accordingly, the step for controlling the VCM 34 according to the present invention is completed. If it has been determined in step 80 that the ready signal has been received, the microcontroller 28 proceeds to step 84, and supplies an unlatching current to the VCM 34 for unlatching the head 4, by controlling the VCM driver 32. As a result, the head 4 positioned in the parking zone B is moved to the data zone C. The hard disk drive is then ready for reading and writing data.

Namely, during the start of the spindle motor 40, the head 4 is moved to the second and third regions of the parking zone B by varying the direction and level of the driving current I(t) inputted to the VCM 34 and thus the contact position between the head 4 and the disk 2 can be decentralized.

As apparent from the foregoing, during the starting and stopping of the spindle motor of the hard disk drive, the present invention controls the voice coil motor of a hard disk drive such that the contact position between the head and the disk can be decentralized and the damage to the lubricating region of the disk can be reduced. Therefore, the reliability of the hard disk drive can be improved.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying, out the present invention, but that the present invention includes all embodiments falling within the scope of the appended claims.

What is claimed is:

1. A method of controlling a voice coil motor of a hard disk drive for decentralizing the abrasion of a parking zone of a disk, said method comprising the steps of:

after power is first supplied to said hard disk drive having a head positioned in a first region within said parking zone, driving a spindle motor in order to rotate said disk and then supplying a first fixed current to a voice coil motor in order to move said head so as to be positioned in said first region therewithin;

supplying to said voice coil motor, a second fixed current in a reverse direction so as to move said head to a second region within said parking zone; and supplying an unlatching current to said voice coil motor so as to move said head to a data zone after sensing a uniform velocity rotation of said spindle motor.

2. The method as claimed in claim 1, further comprising the step of:

after supplying said second fixed current, supplying a third fixed current having the same direction as said second fixed current to said voice coil motor so as to move said head to a third region within said parking zone.

3. The method as claimed in claim 1, wherein said second fixed current is supplied to said voice coil motor so as to move said head to an arbitrary region within said parking zone before said uniform velocity rotation of said spindle motor is reached.

4. The method as claimed in claim 2, wherein said third fixed current is supplied to said voice coil motor so as to move said head to an arbitrary region within said parking zone before said uniform velocity rotation of said spindle motor is reached.

5. An apparatus for controlling a voice coil motor of a hard disk drive for decentralizing the abrasion of a parking zone of a disk, said apparatus comprising:

a first means for driving a spindle motor after power is first supplied to said hard disk drive having a head positioned in a first region within said parking zone, in order to rotate said disk and then supplying a first fixed current to a voice coil motor in order to move said head so as to be positioned in said first region therewithin;

a second means for supplying to said voice coil motor, a second fixed current in a reverse direction so as to move said head to a second region within said parking zone; and a third means for supplying an unlatching current to said voice coil motor so as to move said head to a data zone after sensing a uniform velocity rotation of said spindle motor.

6. The apparatus as claimed in claim 5, further comprising:

a fourth means for supplying a third fixed current having the same direction as said second fixed current to said voice coil motor after supplying said second fixed current, so as to move said head to a third region within said parking zone.

7. The apparatus as claimed in claim 5, wherein said second fixed current is supplied by said second means to said voice coil motor so as to move said head to an arbitrary region within said parking zone before said uniform velocity rotation of said spindle motor is reached.

8. The apparatus as claimed in claim 6, wherein said third fixed current is supplied by said third means to said voice coil motor so as to move said head to an arbitrary region within said parking zone before said uniform velocity rotation of said spindle motor is reached.

9. An apparatus for controlling a voice coil motor of a hard disk drive for decentralizing abrasion of a parking zone of a disk comprising:

a disk data controller connected to an external host computer and a microcontroller;

a digital-analog converter and a voice coil motor driver, said digital-analog converter being connected to said microcontroller for receiving a voice coil motor drive signal from said microcontroller and for converting said signal into an analog signal for outputting to said voice coil motor driver, said voice coil motor driver amplifying an outputting said signal from said digital-to analog converter to the voice coil motor;

a motor controller connected to a spindle motor driver connected to a spindle motor for rotating the hard disk drive, said motor controller receiving spindle motor control signals from said microcontroller and outputting signals corresponding thereto to said spindle motor driver, said spindle motor driver receiving said signals from said motor controller and amplifying and outputting them to said spindle motor so as to drive said spindle motor;

wherein said microcontroller controls said voice coil motor driver and spindle motor driver so as to drive said spindle motor after power is first supplied to said hard disk drive having a head positioned in a first region within said parking zone, in order to rotate said disk and then supplying a first fixed current to the voice coil motor in order to move said head so as to be positioned in said first region therewithin;

wherein said microcontroller further controls said voice coil motor driver so as to supply to said voice coil motor a second fixed current in a reverse direction so as to move said head to a second region within said parking zone; and wherein said microcontroller controls said voice coil motor driver so as to supply an unlatching current to said voice coil motor so as to move said head to a data zone after sensing a uniform velocity rotation of said spindle motor.

10. The apparatus as claimed in claim 9, wherein said microcontroller controls said voice coil motor driver so as to supply a third fixed current having the same direction as said second fixed current to said voice coil motor after supplying said second fixed current so as to move said head to a third region within said parking zone.

11. The method as claimed in claim 2, wherein said second fixed current is supplied to said voice coil motor so as to move said head to an arbitrary region within said parking zone before said uniform velocity rotation of said spindle motor is reached.

12. The apparatus as claimed in claim 6, wherein said second fixed current is supplied by said second means to said voice coil motor so as to move said head to an arbitrary region within said parking zone before said uniform velocity rotation of said spindle motor is reached.

13. The apparatus as claimed in claim 9, said microcontroller controlling said voice coil motor driver so as to supply said second fixed current to said voice coil motor so as to move said head to an arbitrary region within said parking zone before said uniform velocity rotation of the spindle motor is reached.

14. The method as claimed in claim 10, wherein said second fixed current is supplied to said voice coil motor so as to move said head to an arbitrary region within said parking zone before said uniform velocity rotation of said spindle motor is reached.

* * * * *